(12) United States Patent
Gao et al.

(10) Patent No.: US 8,630,407 B2
(45) Date of Patent: Jan. 14, 2014

(54) FOLDABLE PORTABLE ELECTRONIC DEVICE AND ASSEMBLING METHOD THEREOF

(75) Inventors: Ping Gao, Shenzhen (CN); Jun Shen, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 691 days.

(21) Appl. No.: 12/842,144

(22) Filed: Jul. 23, 2010

(65) Prior Publication Data

US 2011/0215692 A1   Sep. 8, 2011

(30) Foreign Application Priority Data

Mar. 3, 2010   (CN) .......................... 2010 1 0116773

(51) Int. Cl.
  *H04M 1/00*   (2006.01)
(52) U.S. Cl.
  USPC .................................. 379/433.13; 455/575.3

(58) Field of Classification Search
  USPC .................. 379/433.13; 455/575.3; 312/326; 29/428; 16/342
  See application file for complete search history.

(56) References Cited

U.S. PATENT DOCUMENTS

| | | | | |
|---|---|---|---|---|
| 5,905,796 | A | * | 5/1999 | Jung ........................ 379/433.13 |
| 7,359,217 | B2 | * | 4/2008 | Pan ............................... 361/814 |
| 7,380,312 | B2 | * | 6/2008 | Ge et al. .......................... 16/342 |
| 8,096,020 | B2 | * | 1/2012 | Tang .............................. 16/337 |
| 2005/0255896 | A1 | * | 11/2005 | Ting ........................... 455/575.3 |
| 2009/0237871 | A1 | * | 9/2009 | Shi et al. .................. 361/679.01 |

\* cited by examiner

*Primary Examiner* — Mohammad Islam
*Assistant Examiner* — Van D Huynh
(74) *Attorney, Agent, or Firm* — Altis Law Group, Inc.

(57) ABSTRACT

A foldable portable electronic device is disclosed including an upper housing, a bottom housing rotatable relative to the upper housing, a hinge, and a sleeve. The upper housing includes a barrel, a latching groove, and a receiving space. The hinge is secured in the receiving space and rotatably engages with the bottom housing. The sleeve is slidably received in the receiving space and can be secured in the receiving space and rotatably engaged with the bottom housing.

18 Claims, 3 Drawing Sheets

FOLDABLE PORTABLE ELECTRONIC DEVICE AND ASSEMBLING METHOD THEREOF

BACKGROUND

1. Technical Field

The present disclosure relates to a foldable portable electronic device and an assembling method thereof.

2. Description of the Related Art

Foldable portable electronic devices such as mobile phones usually include hinges and sleeves. The sleeve and the hinge cooperate to maintain a proper folding function. However, the sleeve is usually fixed to a housing of the portable electronic device, and needs to be deformed during assembly of the hinge to the housing. The sleeve may be rigid to strengthen the stability of the portable electronic device, and accordingly be difficult to deform.

Therefore, there is room for improvement within the art.

BRIEF DESCRIPTION OF THE DRAWINGS

Many aspects of the present foldable portable electronic device and an assembly method thereof can be better understood with reference to the following drawings. The components in the drawings are not necessarily drawn to scale, the emphasis instead being placed upon clearly illustrating the principles of the present foldable portable electronic device and the assembly method thereof. Moreover, in the drawings, like reference numerals designate corresponding parts throughout the several views.

DETAILED DESCRIPTION

Figure 1:
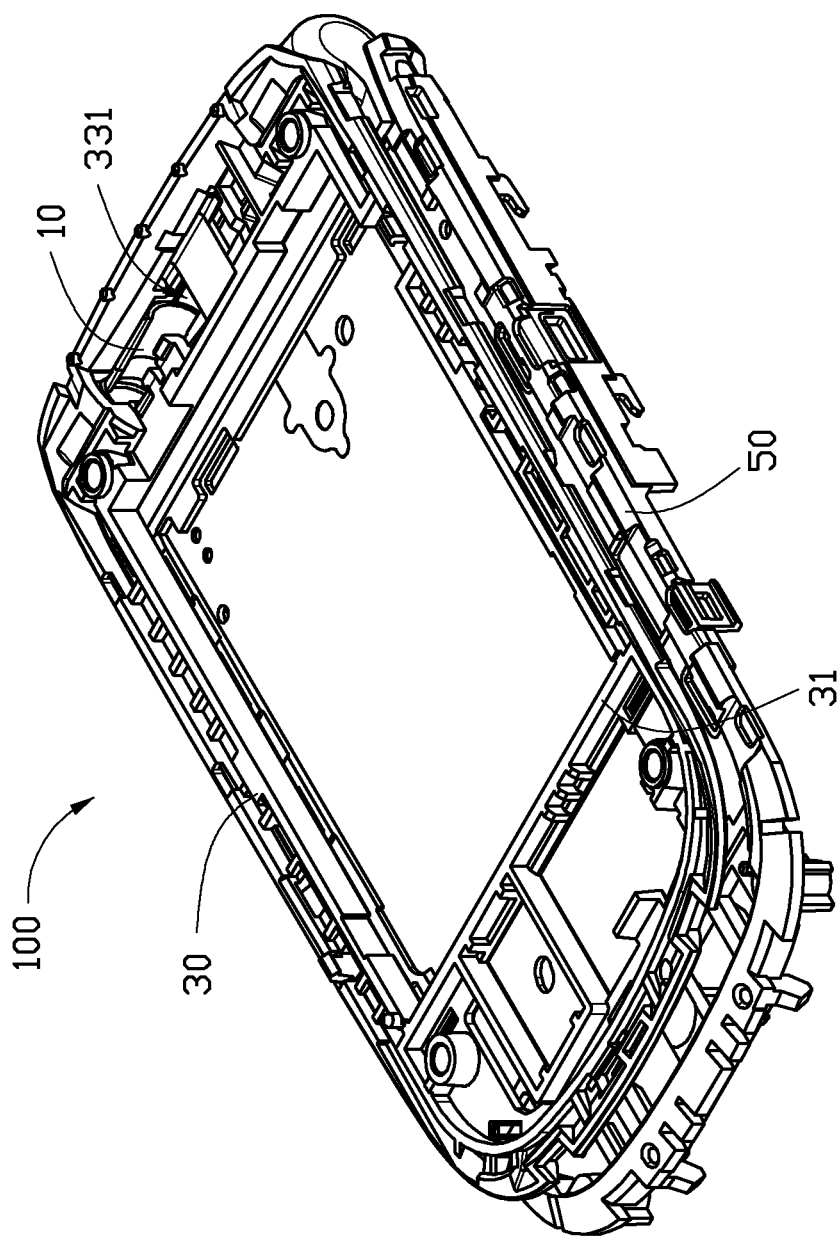
FIG. 1 is an assembled isometric view of a foldable portable electronic device according to an exemplary embodiment.
Figure 2:
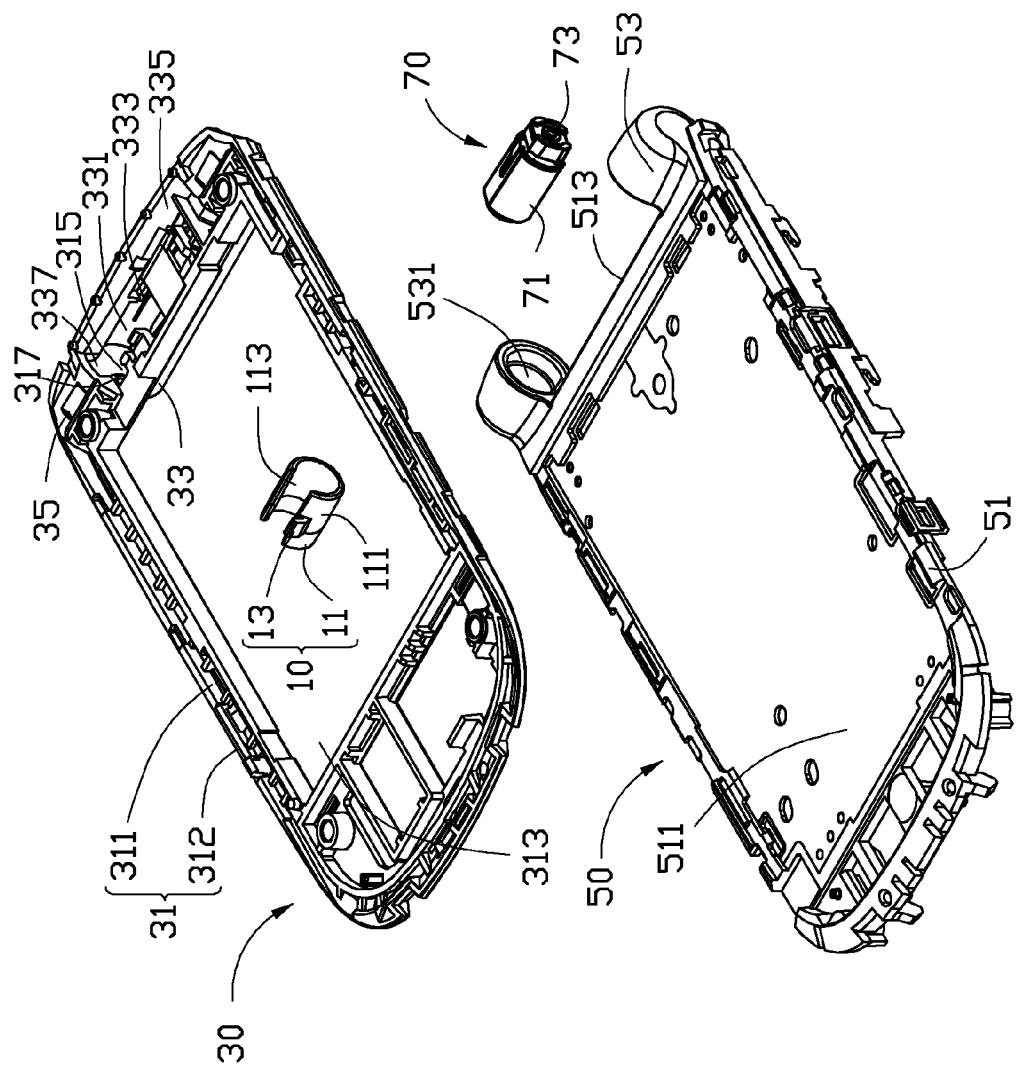
FIG. 2 is an exploded view of the foldable portable electronic device shown in FIG. 1.
Figure 3:
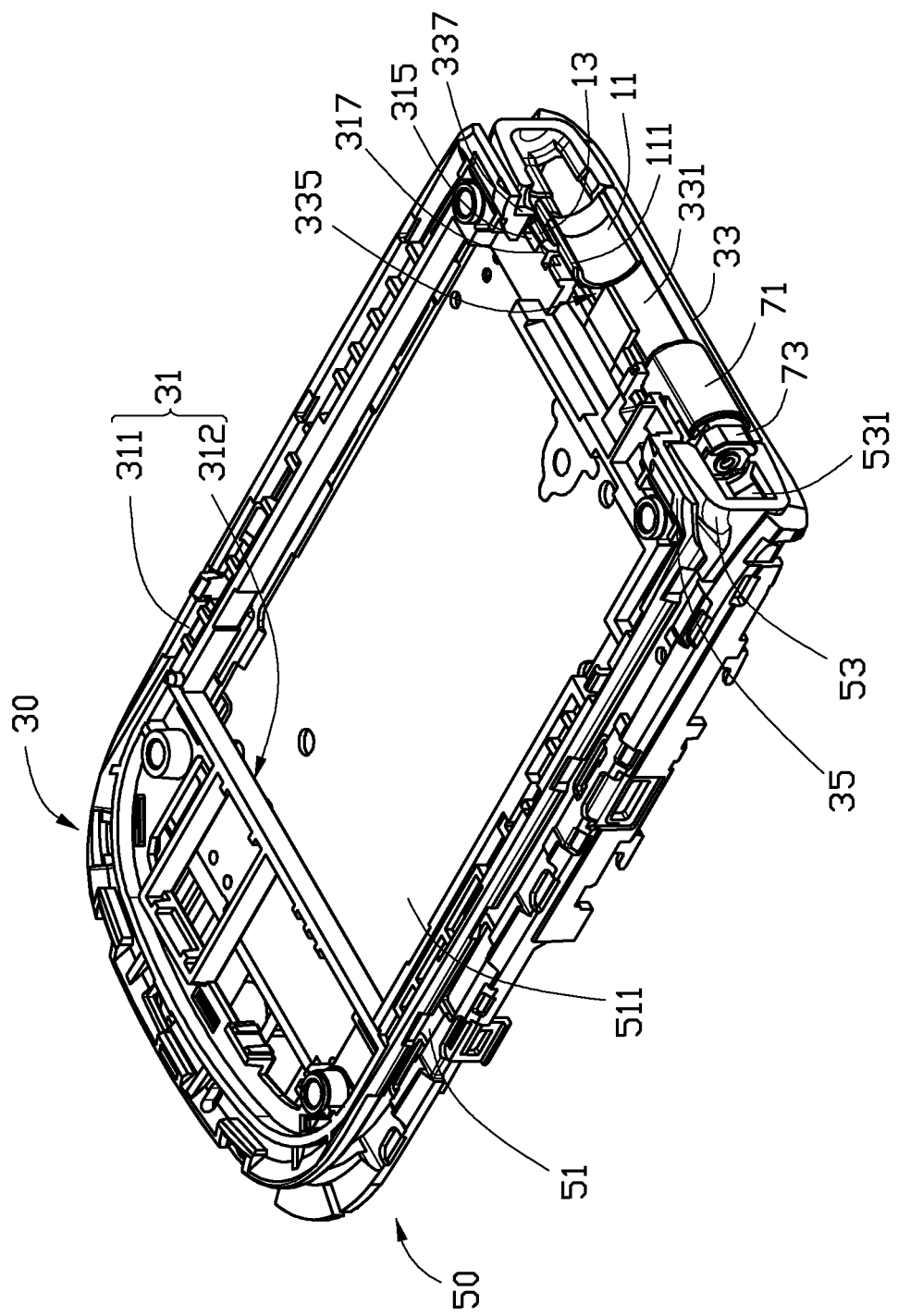
FIG. 3 is a cut away view of the foldable portable electronic device shown in FIG. 1.

FIGS. 1 through 3 show an exemplary embodiment of a foldable portable electronic device 100 including a sleeve 10, an upper housing 30, a bottom housing 50 and a hinge 70.

The sleeve 10 can be made of a rigid material and includes a sleeve body 11 and a latching portion 13 protruding from a circumferential exterior wall 111 of the sleeve body 11. The sleeve body 11 longitudinally defines a notch 113 through the exterior wall 111. The latching portion 13 is positioned adjacent to the notch 113.

The upper housing 30 includes a upper housing body 31 and a barrel 33 protruding down from an end of the upper housing body 31.

The upper housing body 31 includes an exterior surface 311 and an opposite interior surface 312. The upper housing body 31 defines a through cavity 313 at the center for mounting electronic components of the foldable portable electronic device 100. The upper housing body 31 defines a latching groove 315 and a securing portion 317. The latching groove 315 latches the latching portion 13 and receives the resisting portions 35. The securing portion 317 secures the latching portion 13 in the latching groove 315.

FIG. 3 shows the barrel 33 formed on the exterior surface 311, adjacent to the securing portion 317. The barrel 33 defines a receiving space 331, an opening 335, and a sliding slit 337. The opening 335, the sliding slit 337, and the receiving space 331 communicate with each other. The receiving space 331 is longitudinally defined in the barrel 33 to receive the sleeve body 11. A securing rib 333 is formed on the interior surface of the receiving space 331. The securing rib 333 cooperates with the securing portion 317 to secure the sleeve 10 in the receiving space 331. The opening 335 is defined upward through the barrel 33. The sliding slit 337 is defined through the side of the barrel 33, adjacent to the securing portion 317. The sleeve 10 can slide in the sliding slit 337.

The bottom housing 50 includes a bottom housing body 51 and two opposite accommodating portions 53 formed on an end of the bottom housing body 51. The bottom housing body 51 includes a matching wall 511. The two accommodating portions 53 and the end of the bottom housing body 51 cooperatively enclose a mounting groove 513 for mounting the barrel 33. Each of the accommodating portions 53 longitudinally defines a hollow receiving cavity 531. The receiving cavities 531 can receive the sleeve body 11 and secure the hinge body 73, respectively.

The hinge 70 includes a hinge barrel 71 and a hinge body 73. The hinge barrel 71 retractably receives the hinge body 73. The hinge body 73 can rotate relative to the hinge barrel 71.

During assembly of the foldable portable electronic device 100, the bottom housing 50 engages with the upper housing body 31, and the barrel 33 is positioned between the two accommodating portions 53 in the mounting groove 513. The sleeve 10 is aligned with the barrel 33. The sleeve body 11 is aligned with the receiving space 331. The sleeve body 11 passes through the opening 335 into the receiving space 331, aligning with the sliding slit 337. The securing rib 333 is located in the notch 113. The sleeve body 11 further slides in the sliding slit 337. The hinge body 73 is pressed to move into the hinge barrel 71. The hinge 70 passes through the opening 335 and engages in the receiving space 331. The hinge body 73 and the sleeve 10 align with the accommodating portions 53, respectively. The hinge body 73 is released and retracts from the hinge barrel 71 to secure in the receiving cavity 531 of the accommodating portion 53. Accordingly, the hinge 70 rotatably connects the bottom housing 50 to the upper housing 30.

The sleeve 10 slides in the sliding slit 337 until the latching portion 13 aligns with the securing portion 317 and the latching groove 315. The sleeve 10 is rotated within the receiving space 331 until the securing portion 317 resists against the latching portion 13 and the securing rib 333 resists against the exterior wall 111. In this case, the securing portion 317 is secured in the latching groove 315, and the sleeve 10 is secured in the receiving space 331. The assembly of the sleeve 10 and the hinge 70 into the bottom housing 50 and the upper housing 30 is completed.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A foldable portable electronic device, comprising:
    an upper housing comprising a barrel and a latching groove adjacent to the barrel, the barrel defining a receiving space communicating with the latching groove;
    a bottom housing rotatably engaging with the upper housing;

a hinge secured in the receiving space and rotatably engaging with the bottom housing; and a sleeve comprising a sleeve body and a latching portion protruding from an exterior wall of the sleeve body, the sleeve received in the receiving space and rotatably engaging with the bottom housing with the latching portion being latched in the latching groove to prevent the sleeve from moving relative to the barrel.

2. The foldable portable electronic device as claimed in claim 1, wherein:

the bottom housing further comprises a bottom housing body and two opposite accommodating portions on the bottom housing body;

the upper housing further comprises an upper housing body, the upper housing body rotatably engaging with the bottom housing body, the barrel positioned between the accommodating portions.

3. The foldable portable electronic device as claimed in claim 2, wherein the accommodating portions are hollow, the hinge and the sleeve rotatably engaging with the accommodating portions, respectively.

4. The foldable portable electronic device as claimed in claim 3, wherein the hinge comprises a hinge body and a hinge barrel, the hinge body rotatably engaging with one of the accommodating portions, the hinge barrel secured in the receiving space.

5. The foldable portable electronic device as claimed in claim 1, wherein the upper housing further comprises a securing portion adjacent to the latching groove, the securing portion resisting against the latching portion.

6. The foldable portable electronic device as claimed in claim 5, wherein the barrel further comprises a sliding slit communicating with the receiving space, the sleeve slidable within the sliding slit.

7. The foldable portable electronic device as claimed in claim 5, wherein the sleeve body comprises an exterior surface, the barrel forms a securing rib, the securing rib resisting against the exterior surface.

8. The foldable portable electronic device as claimed in claim 5, wherein the barrel further comprises an opening communicating with the receiving space, the sleeve and the hinge exposed from the opening.

9. The foldable portable electronic device as claimed in claim 1, wherein:

the bottom housing further comprises a bottom housing body and two opposite accommodating portions formed on the bottom housing body, and a mounting groove enclosed by the bottom housing body and the accommodating portions; and the upper housing further comprises an upper housing body, the upper housing body rotatably engaging with the bottom housing body, the barrel mounted in the mounting groove.

10. The foldable portable electronic device as claimed in claim 1, wherein the sleeve body longitudinally defines a notch through the exterior wall, and the latching portion is positioned adjacent to the notch.

11. The foldable portable electronic device as claimed in claim 1, wherein the receiving space is longitudinally defined in the barrel; the barrel further comprises an opening communicating with the receiving space; when the latching portion is located in the opening, the sleeve body can rotate and slide within the receiving space until the latching portion enters the latching groove.

12. An assembly method of a foldable portable electronic device, comprising:

providing a bottom housing, an upper housing, a hinge and a sleeve, the upper housing comprising a barrel and a latching groove adjacent to the barrel, the barrel defining a receiving space communicating with the latching groove, the sleeve comprising a sleeve body and a latching portion protruding from an exterior wall of the sleeve body;

engaging the bottom housing with the upper housing;

securing the hinge in the receiving space and rotatably connecting the hinge with the bottom housing;

sliding the sleeve along the receiving space to align the latching portion with the latching groove; and securing the latching portion in the latching groove to prevent the sleeve from moving relative to the barrel, the sleeve simultaneously rotatably engaging with the bottom housing.

13. The assembly method of the foldable portable electronic device as claimed in claim 12, further comprising:

providing the bottom housing with a bottom housing body and two opposite accommodating portions;

providing the upper housing with an upper housing body;

during the step of engaging the bottom housing with the upper housing body, the upper housing body rotatably engages with the bottom housing body, and the barrel is positioned between the accommodating portions.

14. The assembly method of the foldable portable electronic device as claimed in claim 13, wherein:

the accommodating portions are hollow;

providing the hinge with a hinge body and a hinge barrel, the hinge body rotatably engaging with one of the accommodating portions, securing the hinge barrel in the receiving space;

rotatably engaging the sleeve with the other of the accommodating portions.

15. The assembly method of the foldable portable electronic device as claimed in claim 14, wherein the upper housing is further provided with a securing portion adjacent to the latching groove, during the step of securing the latching portion into the latching groove, the securing portion resists against the latching portion.

16. The assembly method of the foldable portable electronic device as claimed in claim 15, further comprising providing the barrel with a sliding slit communicating with the receiving space, during step of sliding the sleeve along the receiving space, the sleeve slides within the sliding slit.

17. The assembly method of the foldable portable electronic device as claimed in claim 15, further comprising providing the sleeve body with an exterior surface, forming a securing rib on the barrel, during the step of securing the latching portion into the latching groove, the securing rib resists against the exterior surface.

18. The assembly method of the foldable portable electronic device as claimed in claim 15, further comprising providing the barrel further comprises an opening communicating with the receiving space, passing the sleeve and the hinge through the opening into the receiving space.

* * * * *